UNITED STATES PATENT OFFICE.

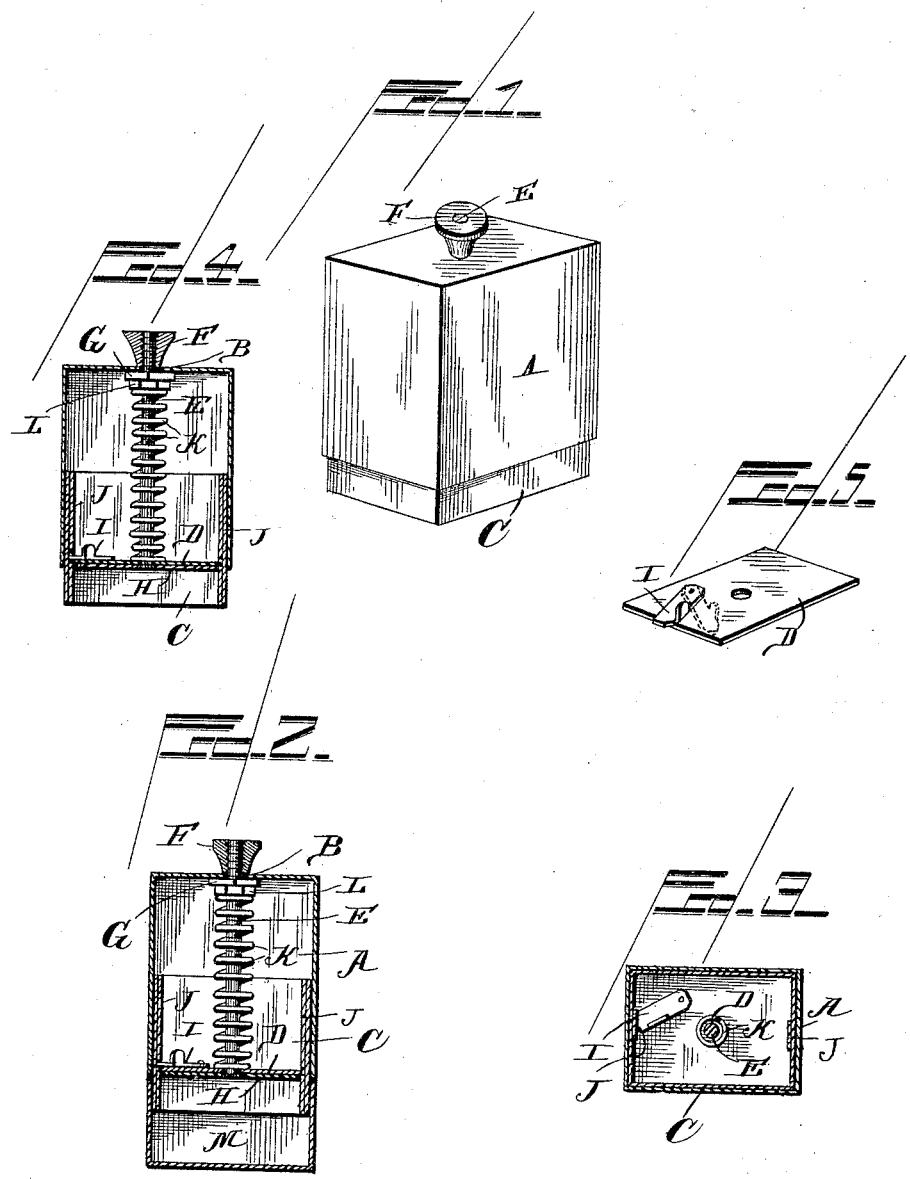

JOHN HARRISON HAGER, OF MARLETTE, MICHIGAN.

DEVICE FOR CARRYING AND APPLYING POSTAGE-STAMPS.

SPECIFICATION forming part of Letters Patent No. 409,283, dated August 20, 1889.

Application filed November 28, 1888. Serial No. 292,100. (No model.)

*To all whom it may concern:*

Be it known that I, JOHN HARRISON HAGER, a citizen of the United States, residing at Marlette, in the county of Sanilac and State of Michigan, have invented a new and useful Improvement in Devices for Carrying and Applying Postage-Stamps, of which the following is a specification.

My invention is a device for carrying and applying postage-stamps; and it consists in certain novel features, hereinafter described and claimed.

In the accompanying drawings, Figure 1 is a perspective view illustrating the manner of using the device. Fig. 2 is a longitudinal section with the cap in place. Fig. 3 is a horizontal transverse section. Fig. 4 is a sectional view similar to Fig. 2, but with the cap removed. Fig. 5 is a detail view of the false bottom.

Referring to the drawings by letter, A designates the casing, which may be made of any suitable material and is of convenient size and weight to be carried in the pocket. The said casing is provided with an open lower end and a closed upper end having a central perforation B, as clearly shown. Within this casing I provide a sliding shell C, which is provided with open ends and with a removable bottom D, from which a stem E projects through the perforation B in the casing. The said stem is provided with a threaded extremity, and on this threaded extremity I mount the nuts F G, which bear against the opposite sides of the bottom of the casing and thereby secure the stem in position. By turning the nuts to or away from the ends of the stem the length of the same within the casing can be readily adjusted.

The inner end of the stem is not secured to the false bottom D, but passes through the same, and is provided with a plate H, which serves as an ejector to apply the stamps. The bottom D of the shell is secured therein by means of a button I, pivoted on the said bottom and adapted to engage a rib J on the side of the shell, as clearly shown in Fig. 3.

A spring K is coiled around the stem between the bottom D and a nut L on the stem, and is adapted to expel the shell after it has been pushed inward in the operation of the device. The tension of the spring, it will be readily understood, can be quickly adjusted to the required degree by turning the nut L in the proper direction.

In practice the postage-stamps are placed within the sliding shell with their gummed sides arranged toward the open end of the same, and a cap M is placed over the shell, as clearly shown in Fig. 2. When thus arranged, the device can be carried in the pocket and the postage-stamps be protected against loss or damage and also arranged in a convenient manner ready for use.

When it is desired to use a stamp, the cap is removed, the gummed side of the upper stamp moistened, and the device inverted over the point at which it is desired to apply the stamp. The casing is then depressed, whereupon the shell will slide upward in the casing, and consequently moving from around the stamp, which will be held in position and securely applied by reason of the pressure exerted thereon, as will be readily understood. Upon releasing the pressure on the casing the coiled spring immediately projects the shell, so that upon raising the device the unused stamps will remain within the shell.

The advantages of my device are thought to be obvious. It is simple in its construction, is composed of very few parts, and can be easily carried in the pocket, so that the stamps will be always ready for use and will be protected against loss or damage.

It will be observed that the construction of my device is such that should any one part be worn out or broken that part can be repaired without necessitating the provision of an entirely new device. The bottom of the sliding shell is secured therein in the manner shown in the drawings in order to facilitate access to the ejector or the shell for the purpose of repairs.

Having thus described my invention, what I claim, and desire to secure by Letters Patent, is—

1. The combination of the casing, the stem secured therein and having a stationary ejector on its inner end, the sliding shell fitting within the casing and around the ejector and provided with a bottom fitting upon the stem, and a spring coiled around the stem between the bottom of the casing and the bottom of the shell, as set forth.

2. The combination of the casing, the shell within the casing, the stem passing through the bottom of the shell and having a threaded portion projected through the bottom of the casing, the ejector secured to the end of the stem within the casing, the nuts mounted on the stem and bearing against the opposite sides of the bottom of the casing, the spring mounted on the stem to project the shell, and the nut mounted on the stem to adjust the tension of the spring, as set forth.

3. The combination of the casing, the shell sliding therein and having a rib on its side, the removable bottom for said shell, and the button on said bottom adapted to engage said rib, as set forth.

In testimony that I claim the foregoing as my own I have hereto affixed my signature in presence of two witnesses.

JOHN HARRISON HAGER.

Witnesses:
D. STUART MCCLURE,
HUGH C. MORRIS.